United States Patent [19]

Bodier et al.

[11] Patent Number: 5,350,035
[45] Date of Patent: Sep. 27, 1994

[54] ANTIHYDROPLANING SYSTEM FOR A MOTOR VEHICLE

[75] Inventors: Rüdiger Bodier, Aying; Hartmut Schmidt, Petershausen, both of Fed. Rep. of Germany

[73] Assignee: Messerschmitt-Boelkow-Blohm GmbH, Ottobrunn, Fed. Rep. of Germany

[21] Appl. No.: 881,270

[22] Filed: May 11, 1992

[51] Int. Cl.⁵ .................. B60K 23/00; B60K 28/16
[52] U.S. Cl. ............................. 180/271; 180/197; 280/727; 280/757; 291/1; 291/2
[58] Field of Search .......... 180/271, 197; 280/727, 280/757; 291/1, 2

[56] References Cited

U.S. PATENT DOCUMENTS

| | | | |
|---|---|---|---|
| 4,063,606 | 12/1977 | Makinson | 291/1 |
| 4,095,147 | 6/1978 | Mountz | 291/2 |
| 5,100,175 | 3/1992 | Swallow et al. | 280/757 |

FOREIGN PATENT DOCUMENTS

| | | |
|---|---|---|
| 2214313 | 10/1973 | Fed. Rep. of Germany . |
| 2800709 | 7/1979 | Fed. Rep. of Germany . |
| 3740433 | 6/1989 | Fed. Rep. of Germany . |
| 4004038 | 8/1991 | Fed. Rep. of Germany . |
| 299435 | 12/1987 | Japan ............................ 180/271 |
| 1-226403 | 12/1989 | Japan . |
| 87/00126 | 1/1987 | World Int. Prop. O. . |

*Primary Examiner*—Mitchell J. Hill
*Attorney, Agent, or Firm*—Evenson, McKeown, Edwards & Lenahan

[57] ABSTRACT

This invention relates to a vehicle comprising an antihydroplaning system, particularly for improving the wheel adhesion despite the presence of a sheet of water on the road. Output signals from sensors for detecting body and chassis vibrations, ambient temperature and other parameters are analyzed to determine when hydroplaning is occurring or about to occur, and to activate antihydroplaning measures.

17 Claims, 2 Drawing Sheets

ANTIHYDROPLANING SYSTEM FOR A MOTOR VEHICLE

BACKGROUND AND SUMMARY OF THE INVENTION

This invention relates to an antihydroplaning system for a motor vehicle in which the start of a hydroplaning of the motor vehicle tires on sheets of water on roads because of a lack of contact with the road (slip) is recognized electronically.

So-called slip control systems (ASR's) are known which determine an adhesion coefficient dependent on the condition of the road surface, and a relevant slip threshold as a function thereof. See, for example, German Patent Document DE-OS 37 40 433 A1.

Arrangements for eliminating the hydroplaning effect caused by water puddles on the road, for example by breaking up the water film by means of a gas jet arriving before the tare, are disclosed in the German Patent Documents 22 39 022 A1, DE-OS 26 00 787 A1, and DE-OS 34 17 048 A1. In particular, these devices involve the use of a compressed-air jet.

Japanese Patent Document JP 1-226 403 (A) in: Patent Abstracts of Japan, Section M. Vol. 13 (1989), No. 552 (M-903), discloses a device for improving wheel adhesion in which friction-promoting means provided in front of the wheels of the vehicle are controlled by a computer in response to a logical linking of sensor signals for the detection of the rotational wheel speed (in order to recognize the slip of the wheels), and additional sensors (for example, for the driving speed, the actuating of the brake, the rotational engine speed), as well as by means of electronic devices for the signal analysis and the evaluation of the signals which are supplied by the individual sensors to the evaluating device of the computer.

Modern road vehicles, particularly passenger cars, routinely include the following vehicle-borne installations:
a computer,
vehicle electronic system with its own power supply;
a hydraulic system and devices for controlling it, particularly by means of the electronic system;
an antilock system,
a slip control system, the two latter control systems comprising at least one and preferably several sensors for the detection of rotational wheel speeds.
at least one ambient temperature sensor, either for the purpose of the engine/fuel control or for the purpose of air conditioning the vehicle interior.

In addition, the system on which the present invention is based also comprises a device, known per se, for aiming a mass jet in front of the wheels of the vehicle.

It is an object of the invention generally to reduce the danger of accidents, and in particular to provide a system which is capable of reliably detecting and recognizing the above-described hydroplaning effect by means of electronic recognition devices, and initiating measures to combat and eliminate it.

This object is achieved by the antihydroplaning system according to the invention in which, unlike present antilock system (ABS) and slip control systems (wherein only the rotational wheel speed is evaluated as the main signal), the outputs of a variety of sensors are analyzed to recognize clearly whether there is the danger of hydroplaning (that is, the start of a hydroplaning by the tires over sheets of water). Where a danger of hydroplaning is determined to exist, the invention triggers a warning, or a countermeasure to break up the water layer.

The antihydroplaning system according to the invention includes, for example, measuring devices to detect vibration of the chassis. Advantageously, these are acoustic sensors, which are mounted preferably on an axle (front axle) of the vehicle. Such sensors aid (for example, by means of a frequency analyzer), in rapidly recognizing the difference between the vibration action on a dry road and in the case of hydroplaning. In addition, the antihydroplaning system according to the invention also has an acoustic sensor for vibration of the vehicle body, which detects the splashing-up of water from a wet road.

The slip of the wheels when the road surface is wet is recognized by means of the rotational wheel speed sensors of the vehicle. When hydroplaning occurs, particularly during breaking, this technique results in rapid recognition of the danger because, in this driving condition, the low coefficient of friction results in an immediate reduction of the rotational speed of the hydroplaning wheels. During acceleration, the reversed slip is similarly a measurement of a dangerous situation. When the vehicle coasts, a hydroplaning effect is also recognized by way of the slip since the hydroplaning wheels are also braked.

Hydroplaning vehicle tires are distinguished by the fact that the curvature of the tire changes in a typical manner at the contact area of the wheel, which phenomenon can also be utilized to detect the occurrence of hydroplaning. Moreover, a distinction with respect to icy patches can be achieved by means of a temperature sensor which measures the temperature of the vehicle surroundings, and thus determines reliably whether it is possible for hydroplaning to occur. (This effect, of course, does not occur below a specific temperature (for example, below 0° C.).

The measures according to invention are not intended primarily for protection against the slipperiness of ice, as to which the inventors have suggested other devices and measures.

By linking the measured values detected by the sensors in a vehicle computer and comparing them with stored vibration curves, the occurrence of a hydroplaning effect is clearly recognized. By means of the output signal of the computer "hydroplaning is occurring", yes or no, or "is within a range with predetermined thresholds", either a warning signal or the following countermeasures can be activated:

The water layer in front of the tire is broken up by means of a mass jet of gas, liquid or particles.

The steering booster/power steering is disabled, thus largely avoiding a dangerous locking of the wheels.

The fuel supply, is throttled, initiating a moderate vehicle deceleration and therefore a reduction of the danger potential.

The water layer is displaced by mechanical devices.

Concurrent activation of different above-described countermeasures may also be advantageous.

Other objects, advantages and novel features of the present invention will become apparent from the following detailed description of the invention when considered in conjunction with the accompanying drawings.

DETAILED DESCRIPTION OF THE DRAWINGS

Figure 1:
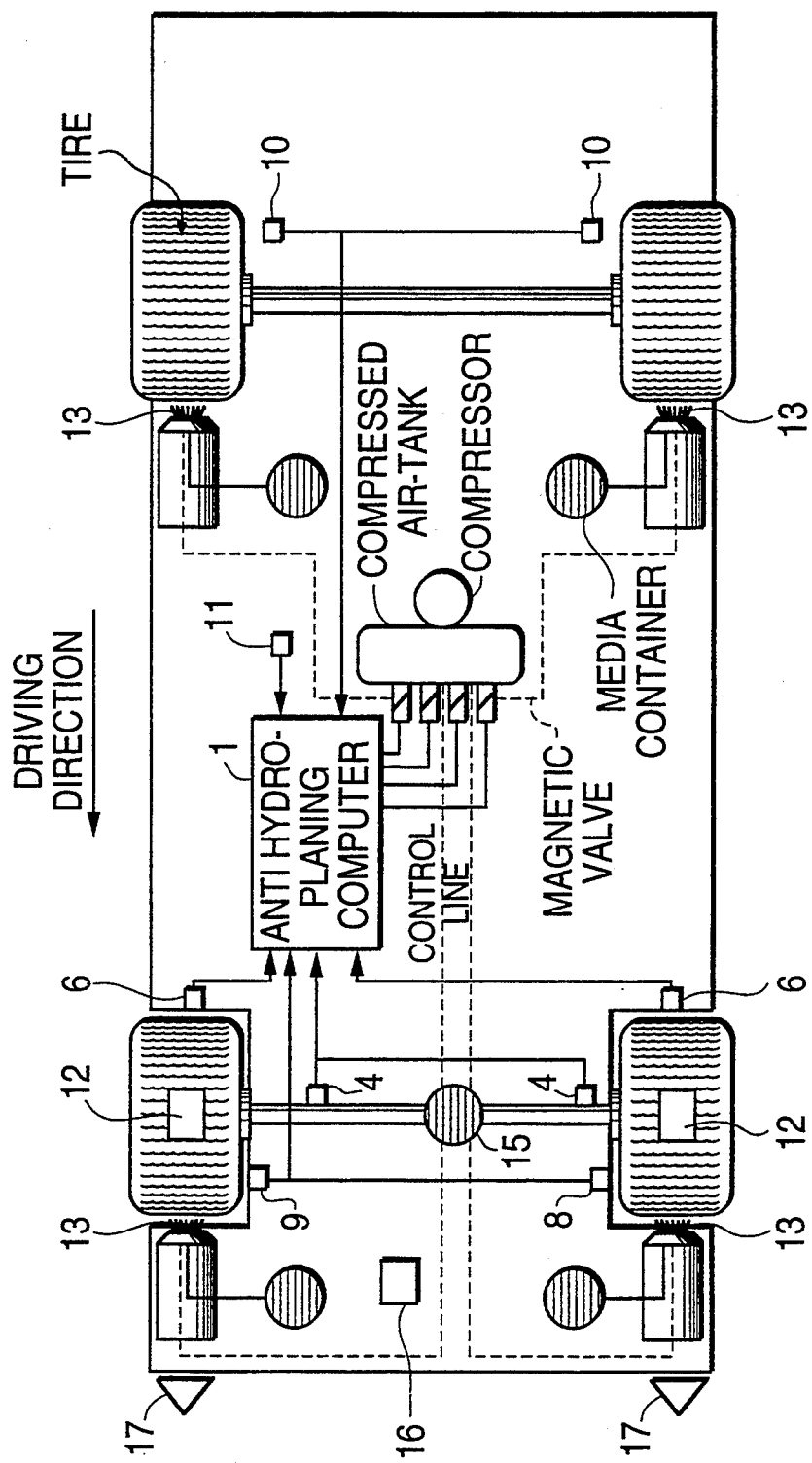
FIG. 1 is a schematic diagram of a road vehicle comprising an antihydroplaning system according to the invention.

As illustrated in FIG. 1, a bottom view of the motor vehicle shows that at least one sensor 8, 9, 10 is assigned to each wheel to sense rotational wheel speed (revolutions per minute) in order to recognize the slip of the wheels. Electronic analysis and recognition are performed by a computer 1, utilizing the characteristic diagram 2 illustrated in FIG. 3, to eliminate or at least to break up a water layer in front of the wheels which causes the hydroplaning effect.

To detect vibration of the chassis, acoustic sensors 4 are assigned to the computer 1, which includes a device for analyzing the signals of this sensor, as a component of the antihydroplaning system. The devices for recognizing the vibration action of the vehicle body are also acoustic sensors 6; for example, piezoelectric elements, such as piezoelectric quartzes. These sensors are connected with a device 7 (FIG. 2) for analyzing their output signals in order to detect vibrations due to a possible splashing-up of water on the vehicle body.

Reference number 11 marks the temperature sensor which may be installed, for example, in the area of the front bumper, while reference number 12 indicates a sensor which is provided for detecting the wheel curvature of a tire contact area. This may be, for example, an optical sensor (such as a laser sensor), a radar measuring system, an ultrasonic measuring system, or the like.

The measured values are transmitted by the various sensors to their respective signal processing devices (FIG. 2) which, in turn, are connected with the computer 1. Further analysis, such as a frequency analysis or an amplitude, phase or similar analysis, is performed by the computer, for comparison in a known manner with curves stored in a memory of the computer. The above-mentioned yes/no statement can then be made on the basis of the evaluation in a characteristic diagram 2, as illustrated in FIG. 3, in which the hydroplaning area is clearly defined according to threshold values. On the Y-axis in FIG. 3, the frequency of the vibrations at the vehicle body are entered; the vibrations on the chassis are entered on the X-axis; and the temperature is entered on the Z-axis. Any combination of values falling within the limits (shown as a cube FIG. 2) is interpreted as indicating a danger of hydroplaning.

Figure 2:
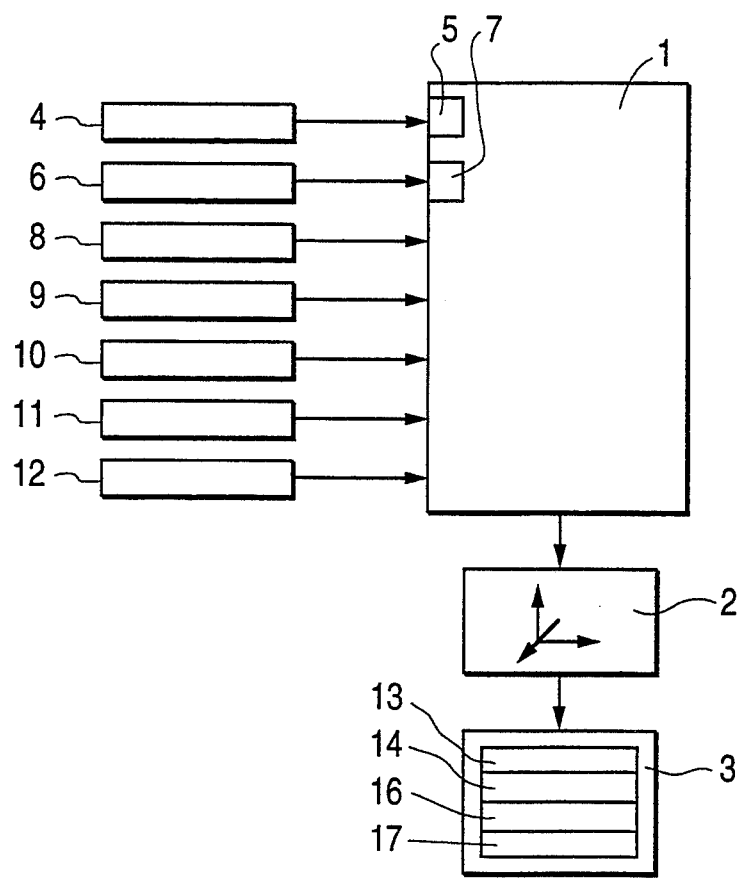
FIG. 2 is a schematic depiction of the analysis and control apparatus according to the invention.
Figure 3:
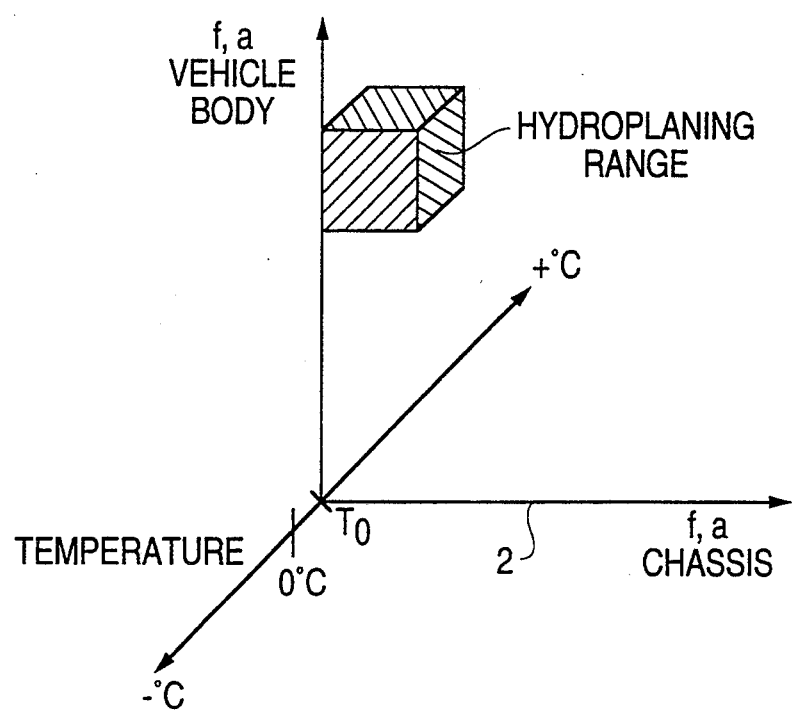
FIG. 3 is a characteristic diagram showing the relationship among vibration frequency of the vehicle body and of the chassis and temperature for actuating acoustic sensors with splashing water.

After evaluation and the emission of an output signal indicative of hydroplaning, the water layer which has caused the hydroplaning effect is attacked by specific means at 3 (FIG. 2). Splashing water will excite the acoustic sensors on the vehicle body only when the vibration is in the range illustrated in FIG. 3 (hydroplaning range), which may be determined mathematically or empirically.

On the X-axis, vibrations of the chassis caused by the hydroplaning of the wheels which lead to vibrations of the axle are detected by means of an additional acoustic sensor assigned to the center of the axle (see FIG. 1).

The measured values entered on the Z-axis in the characteristic diagram of FIG. 3, detected by the temperature sensor, are used in the analysis or evaluation in the computer 1 only if the temperature is in a range in which rain is possible (as opposed to the possible formation of ice or snow). In the example illustrated in FIG. 3 this is set at approximately ±4° C.

The means for the breaking-up or destruction of the water layer 3 are shown schematically in FIG. 2, and in their arrangement in FIG. 1. This is a device which generates a mass jet that displaces the water layer mechanically. The mass jet is a time-controlled pneumatic, hydraulic or electric device which is known per se, and originates from a reservoir. It may be a gas jet, a liquid jet or a particle jet (or a combination thereof) aimed in front of the wheel by nozzles 13 when the computer has emitted an output signal indicative of hydroplaning. Additionally, by means of a preferably electronic control device 14, the steering booster or power steering 15 can be switched off. This may take place, for example, by means of an electromagnetic valve which reduces the pressure of the steering gear. Thus a dangerous "tearing-away" of the steering can be avoided when the hydroplaning effect occurs.

A further control device 16 interrupts the fuel supply to the engine or throttles it in the event of hydroplaning in order to ensure a soft braking of the vehicle. This may also take place by means of an electromagnetic valve, as is customary in the case of vehicles with slip control systems or antilock systems (in the hydraulic system). Reference number 17 indicates a device to mechanically displace the water layer, which may consist of elastic deflectors made, for example, of rubber, arranged on the front bumpers in front of the wheels, so that they can be deflected against the driving direction.

In addition to the emission of a mass jet, other measures may be taken, such as the activation of antiswerve or antislide devices. Other devices for improving the driving situation, particularly for preventing swerving, may also be used, as well as additional sensors, particularly for detecting a speed, an acceleration or a change of these parameters. The same applies to the detection of the pressure or of changes of the pressure in the hydraulic system as well as the use of known devices in order to determine wheel adhesion, particularly its coefficient, in relation to the road and its condition; the same applies to the evaluation of changes of the characteristic curve of the tire by means of characteristic curves stored in the computer.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An antihydroplaning system for improving wheel adhesion of a motor vehicle, having at least one wheel with a tire, a fuel supply, an engine an da steering booster, in the presence of water on a road surface, comprising:

a first sensor for generating first signals indicative of ambient temperature of the vehicle surroundings;

a second sensor for generating second signals indicative of chassis vibration;

a third sensor for generating third signals indicative of vibration of at least a part of a vehicle body which can be influenced by water splashed from a road surface;

a fourth sensor for generating fourth signals indicative of rotational speed and slippage of wheels of said vehicle;

electronic means for analyzing and evaluating said first, second, third and fourth signals and for generating output signals;

a computer coupled to receive said output signals from said electronic means; and wheel adhesion means for mechanically displacing a water layer on said road surface in front of wheels of said vehicle by means of a mass jet;

said wheel adhesion means being controlled over time by said computer in response to a logical analysis of output signals from said electronic means.

2. Antihydroplaning system according to claim 1, wherein said computer has stored therein a characteristic diagram defining conditions indicative of hydroplaning of said vehicle, said computer comparing at least one of said first, second, third and fourth signals with said characteristic diagram to determine whether said at least one of said first, second, third and fourth signals fall within said conditions, and initiating an acoustic warning for a driver of said vehicle.

3. An antihydroplaning system according to claim 2, wherein the antihydroplaning system initiates a controlled braking by throttling the fuel supply of the vehicle engine.

4. An antihydroplaning system according to claim 2, wherein said third sensor is an acoustic sensor.

5. An antihydroplaning system according to claim 2, wherein the second sensor comprises means for detecting hydroplaning of the tire.

6. An antihydroplaning system according to claim 1, wherein the antihydroplaning system initiates a controlled braking by throttling the fuel supply of the vehicle engine.

7. An antihydroplaning system according to claim 6, wherein said third sensor is an acoustic sensor.

8. An antihydroplaning system according to claim 1, wherein said third sensor is an acoustic sensor.

9. An antihydroplaning system according to claim 1, wherein the second sensor comprises means for detecting hydroplaning of the tire.

10. An antihydroplaning system according to claim 9, wherein a frequency analyzer is operatively connected with said means for detecting hydroplaning, and said means for detecting hydroplaning comprises an acoustic sensor assigned to an axle of the vehicle.

11. An antihydroplaning system according to claim 10, wherein the frequency analyzer detects both amplitude and phase changes of at least one of said first, second and third output signals.

12. An antihydroplaning system according to claim 9, wherein said means for detecting hydroplaning comprise an optical sensor for detecting curvature of said tire.

13. Antihydroplaning system according to claim 1, wherein said mass jet comprises a gas jet.

14. Antihydroplaning system according to claim 1, wherein said mass jet comprises a liquid jet.

15. Antihydroplaning system according to claim 1, wherein said mass jet comprises a jet of particles.

16. Antihydroplaning system according to claim 1, wherein said computer has stored therein a characteristic diagram defining conditions indicative of hydroplaning of said vehicle, said computer comparing at least one of said first, second, third and fourth signals with said characteristic diagram to determine whether said at least one of said first, second, third and fourth signals fall within said conditions, and initiating remedial measures to reduce said hydroplaning.

17. An antihydroplaning system according to claim 16, wherein said steering booster of said vehicle is switched off by the antihydroplaning system simultaneously with initiation of said remedial measures to reduce hydroplaning.

* * * * *